US012614800B2

(12) United States Patent
Park et al.

(10) Patent No.: US 12,614,800 B2
(45) Date of Patent: Apr. 28, 2026

(54) BATTERY PACK WITH IMPROVED VIBRATION RESISTANCE

(71) Applicant: LG ENERGY SOLUTION, LTD., Seoul (KR)

(72) Inventors: Jin Ju Park, Daejeon (KR); Sang Ho Park, Daejeon (KR); Seok Ho Jang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 644 days.

(21) Appl. No.: 17/765,579

(22) PCT Filed: Jan. 15, 2021

(86) PCT No.: PCT/KR2021/000571
§ 371 (c)(1),
(2) Date: Mar. 31, 2022

(87) PCT Pub. No.: WO2021/149975
PCT Pub. Date: Jul. 29, 2021

(65) Prior Publication Data
US 2022/0367955 A1     Nov. 17, 2022

(30) Foreign Application Priority Data

Jan. 23, 2020     (KR) ........................ 10-2020-0009202

(51) Int. Cl.
*H01M 50/242*     (2021.01)
*H01M 10/42*     (2006.01)
(Continued)

(52) U.S. Cl.
CPC ....... *H01M 50/242* (2021.01); *H01M 10/425* (2013.01); *H01M 50/209* (2021.01);
(Continued)

(58) Field of Classification Search
CPC ............. H01M 50/242; H01M 50/209; H01M 50/258; H01M 50/291; H01M 50/244;
(Continued)

(56) References Cited

U.S. PATENT DOCUMENTS

2006/0093899 A1*   5/2006   Jeon .................. H01M 10/0472
                                                                    429/153
2008/0299453 A1    12/2008   Shinyashiki et al.
(Continued)

FOREIGN PATENT DOCUMENTS

CN         105304833 A       2/2016
CN         205863349 U       1/2017
(Continued)

OTHER PUBLICATIONS

English Translation of KR 20160144764 A-Battery Pack; LG Chemical; Dec. 19, 2016 (Year: 2016).*
(Continued)

*Primary Examiner* — Adam J Francis
(74) *Attorney, Agent, or Firm* — Birch, Stewart, Kolasch & Birch, LLP

(57)     ABSTRACT

A battery pack includes a housing having a predetermined space portion, an end plate received in the space portion, the end plate including a horizontal plate located parallel to the bottom surface of the housing and a pair of vertical plates extending from opposite edges of the horizontal plate in a perpendicular direction, and a plurality of cell cartridges received in the end plate so as to be vertically disposed, wherein a plurality of pairs of first recessed portions facing each other is provided in the inner surface of the housing, and protrusions configured to be coupled to the first recessed portions are provided on opposite ends of the cell cartridges in a thickness direction.

13 Claims, 5 Drawing Sheets

(51) Int. Cl.
  *H01M 50/209*       (2021.01)
  *H01M 50/258*       (2021.01)
  *H01M 50/291*       (2021.01)

(52) U.S. Cl.
  CPC ....... *H01M 50/258* (2021.01); *H01M 50/291*
       (2021.01); *H01M 2010/4271* (2013.01)

(58) Field of Classification Search
  CPC .... H01M 50/262; H01M 50/26; H01M 50/20;
       H01M 10/425; H01M 10/42; H01M
       2010/4271; H01M 2220/30; H01M
       2220/20
  See application file for complete search history.

(56)                 References Cited

U.S. PATENT DOCUMENTS

2009/0226806  A1*   9/2009   Kiya .................... B60R 16/04
                                                              429/186
2012/0048630  A1    3/2012   Nishiura et al.
2012/0298433  A1    11/2012  Ohkura
2013/0052516  A1    2/2013   Kim
2015/0089981  A1*   4/2015   Renfro ............... H01M 50/278
                                                              70/164
2015/0099146  A1*   4/2015   Kim ................... H01M 10/625
                                                              429/53
2016/0233465  A1    8/2016   Lee et al.
2017/0200925  A1    7/2017   Seo et al.
2018/0053921  A1*   2/2018   Kim ................... H01M 10/058
2018/0102565  A1*   4/2018   Yamamoto ........ H01M 10/0472
2018/0138474  A1    5/2018   Choi et al.
2018/0212215  A1*   7/2018   Park ................... H01M 10/425
2019/0198952  A1    6/2019   Choi et al.

FOREIGN PATENT DOCUMENTS

CN         107431163   A        12/2017
CN         107925030   A         4/2018
CN         209859994   U        12/2019
JP        2006-128122   A         5/2006
JP        2008-300288   A        12/2008
JP        2011-171176   A         9/2011
JP        2012-248299   A        12/2012
JP         2013-45765   A         3/2013
JP         2015-82493   A         4/2015
JP        2017142942   A    *    8/2017
JP        2018-530888   A        10/2018
KR        20060037598   A    *    5/2006
KR      10-2013-0126159  A        11/2013
KR      10-2014-0147555  A        12/2014
KR      10-2015-0055255  A         5/2015
KR      10-2016-0016502  A         2/2016
KR        20160144764   A    *   12/2016
KR      10-2017-0022119  A         3/2017
KR      10-2017-0055719  A         5/2017
KR      10-2019-0091631  A         8/2019
KR      10-2019-0108380  A         9/2019
WO       WO 2014/065110  A1        5/2014

OTHER PUBLICATIONS

English Translation of KR20060037598 A; Secondary Battery Module; Samsung SDI CO LTD; May 3, 2006 (Year: 2006).*
International Search Repori (PCT/ISA/210) issued in PCT/KR2021/000571 mailed on Apr. 23, 2021.
Extended European Search Report for European Application No. 21744541.0, dated May 13, 2024.

* cited by examiner

【FIG. 1】
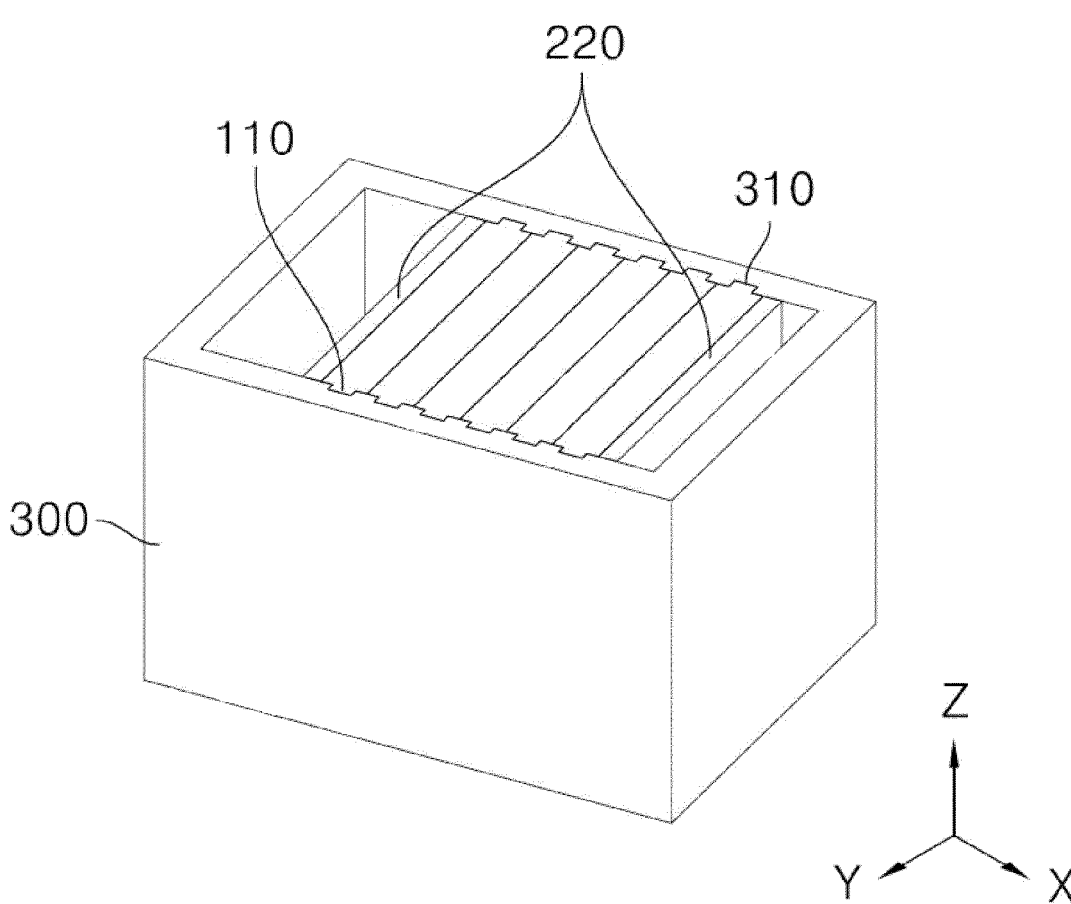

【FIG. 2】
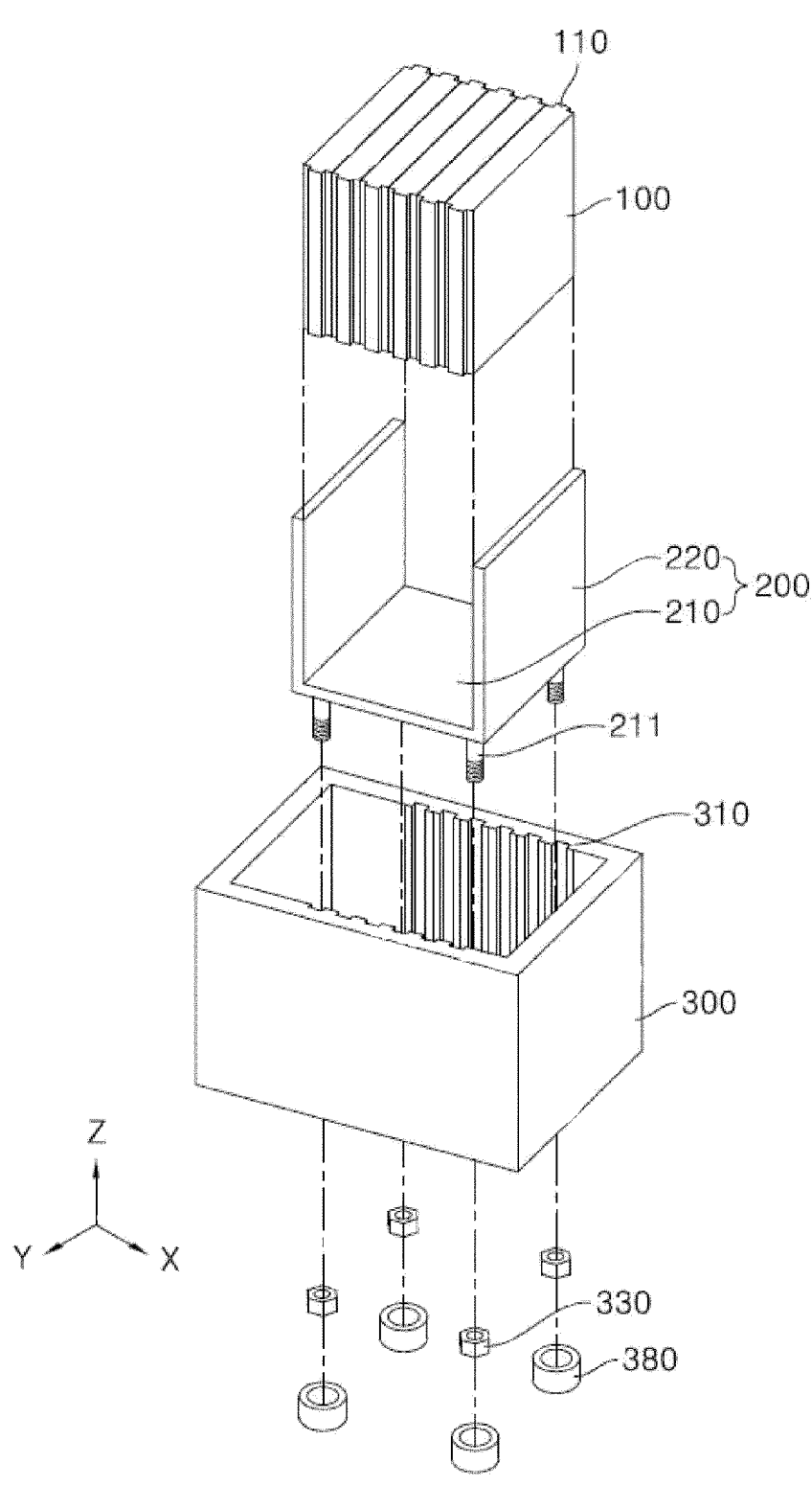

【FIG. 3】
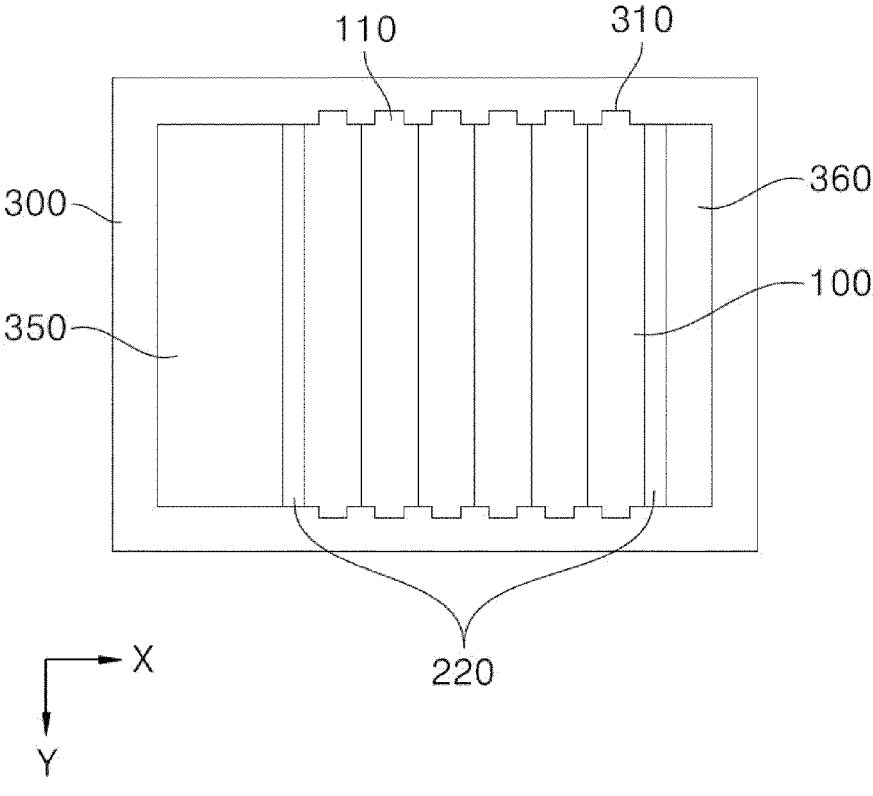
【FIG. 4】
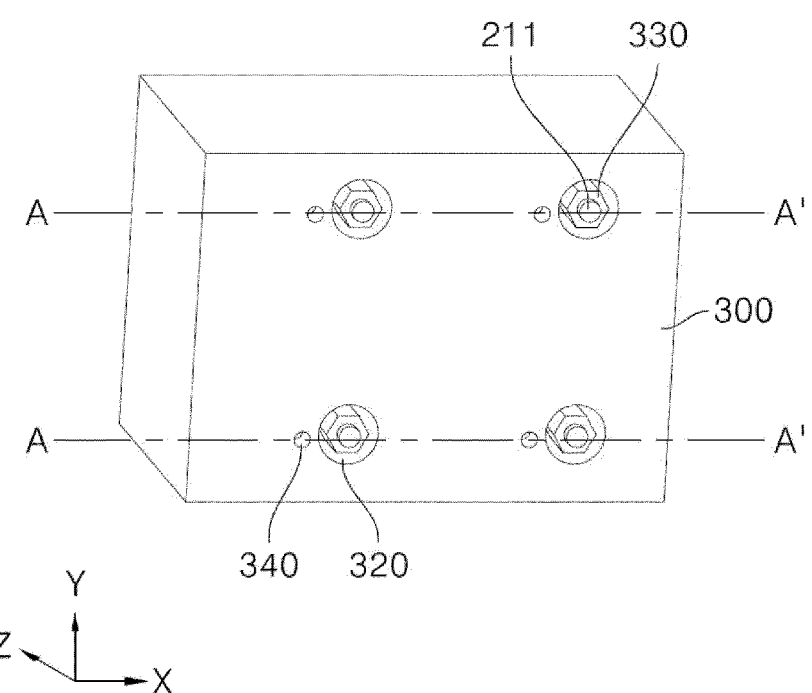

【FIG. 5】
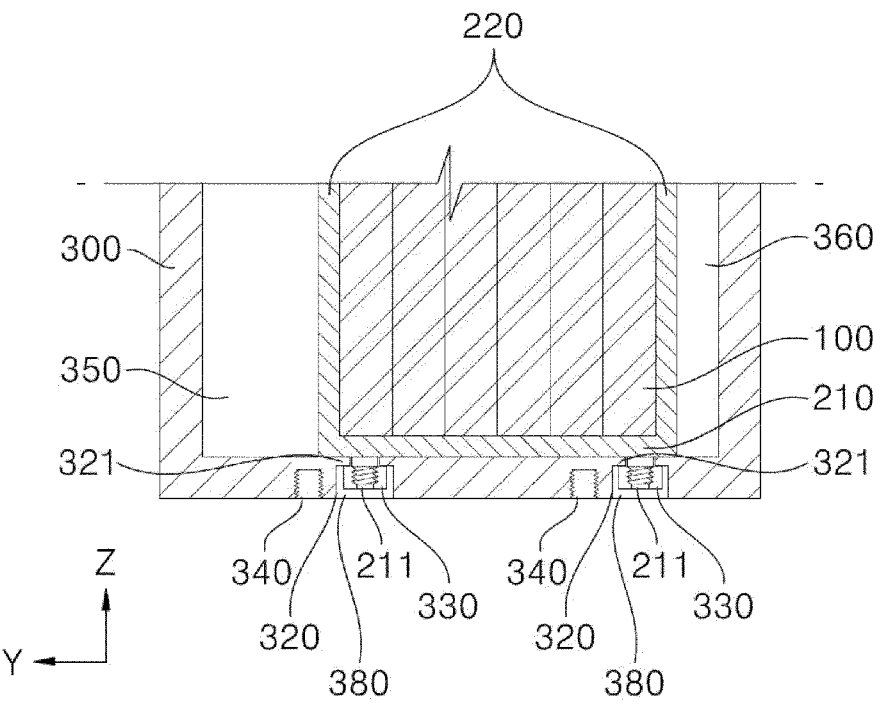
【FIG. 6】
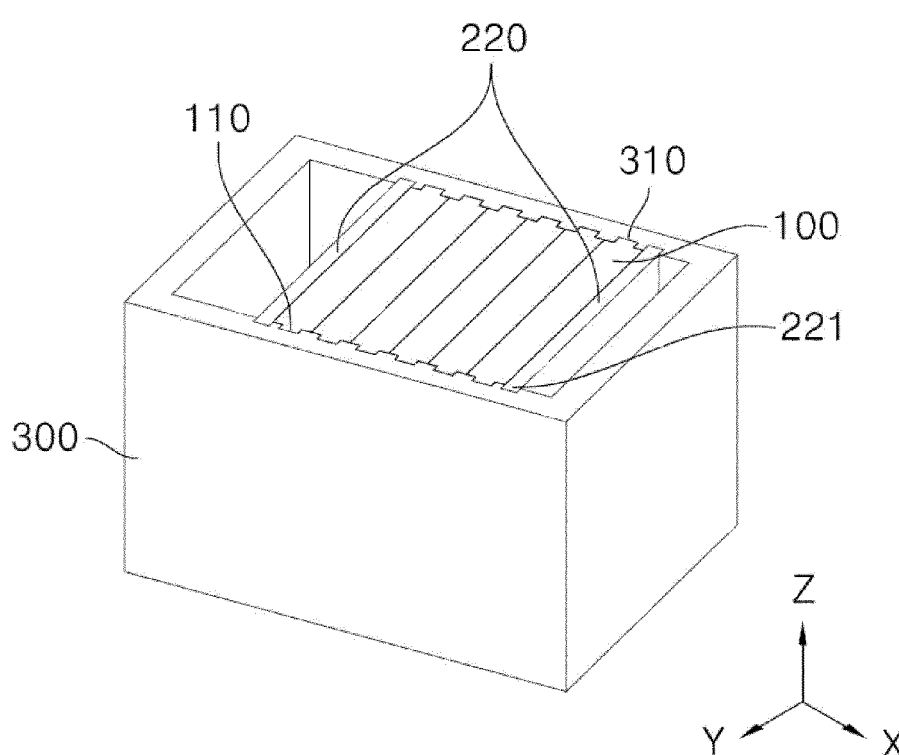

【FIG. 7】
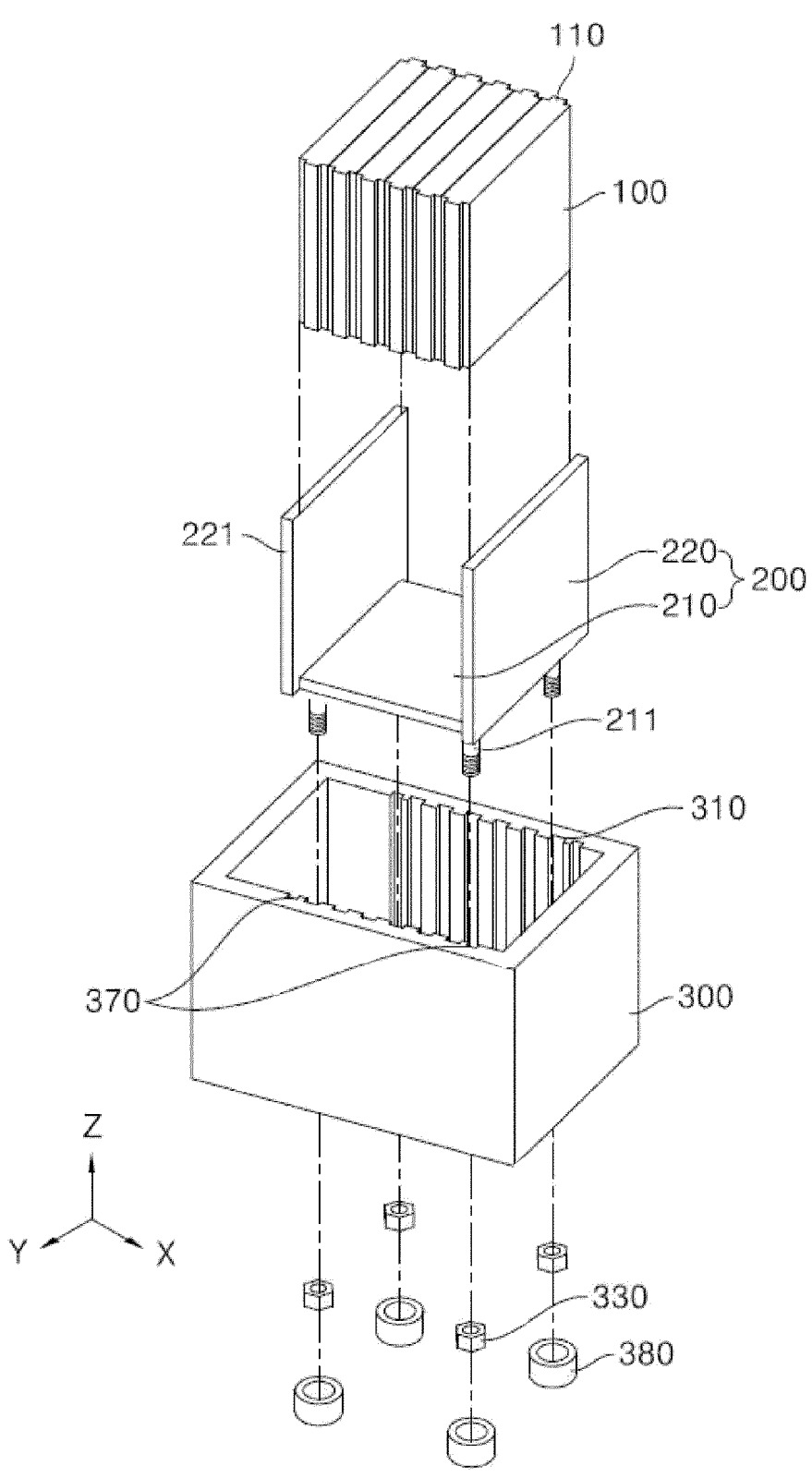

BATTERY PACK WITH IMPROVED VIBRATION RESISTANCE

TECHNICAL FIELD

This application claims the benefit of priority to Korean Patent Application No. 2020-0009202 filed on Jan. 23, 2020, the disclosure of which is incorporated herein by reference in its entirety.

The present invention relates to a battery pack with improved vibration resistance, and more particularly to a battery pack with improved vibration resistance that is configured to have a structure in which protrusions are formed in the side surfaces of a cell cartridge and recessed portions configured to receive the protrusions of the cell cartridge are formed in a housing such that, even when external impact is applied to the battery pack, movement of the cell cartridge in a leftward-rightward direction and in a forward-rearward direction is inhibited.

BACKGROUND ART

With technological development of mobile devices, such as mobile phones, laptop computers, camcorders, and digital cameras, and an increase in demand therefor, research on secondary batteries, which are capable of being charged and discharged, has been actively conducted. In addition, secondary batteries, which are energy sources substituting for fossil fuels causing air pollution, have been applied to an electric vehicle (EV), a hybrid electric vehicle, and a plug-in hybrid electric vehicle (P-HEV), and therefore there is an increasing necessity for development of secondary batteries.

There are a nickel-cadmium battery, a nickel-hydride battery, a nickel-zinc battery, and a lithium secondary battery as currently commercialized secondary batteries. Thereamong, the lithium secondary battery is in the spotlight, since the lithium secondary battery has little memory effect, whereby the lithium secondary battery is capable of being freely charged and discharged, has a very low self-discharge rate, and has high energy density, compared to the nickel-based secondary batteries.

Required capacities of secondary batteries, which are used as energy sources for various kinds of electronic devices that are essentially and indispensably used in modern society, have been increased due to an increase in use of mobile devices, complexity of the mobile devices, and development of electric vehicles.

Meanwhile, in order to increase the capacity and output of a secondary battery, a plurality of battery cells and/or battery modules is connected to each other in series or in parallel. The battery cells are mounted in various kinds of devices in the state of being received in a cell cartridge or a housing.

In general, when a battery pack is used in the state of being mounted in a device, vibration or external impact may be transferred to the battery pack. For this reason, it is necessary to securely fix battery cells or battery modules received in the battery pack.

In connection therewith, Korean Patent Application Publication No. 2017-0022119 discloses a battery module including a battery cell assembly constituted by a plurality of stacked battery cells, an end plate configured to cover the front and the rear of the battery cell assembly, the end plate being screw-engaged with the battery cell assembly at one side thereof, and a fixing holder mounted to the other side of the end plate to at least partially cover the battery cell assembly, the fixing holder protruding from the front and the rear of the end plate.

In Korean Patent Application Publication No. 2017-0022119, the lower end of the battery module is fixed to the housing using the additional fixing holder, whereby coupling reliability and stability are improved. However, the battery module is fixed so as not to move by only vibration in the forward-rearward direction or in the leftward-rightward direction. Furthermore, since the additional fixing holder is used, there is a disadvantage in that cost is increased and the volume of a product is increased.

In addition, Japanese Patent Application Publication No. 2011-171178 discloses a battery pack including a plurality of secondary battery cells, a pack case having receiving holes configured to receive the secondary battery cells and screw receiving holes, and a cover having screw holes aligned with the screw receiving holes, the cover being fixed to the pack case by screws inserted through the screw holes and the screw receiving holes, wherein the sectional shape of each of the secondary battery cells is an oval pillar shape, the shape of each of the receiving holes is a pillar shape having the same sectional shape as a corresponding one of the secondary battery cells, and the plurality of screw receiving holes is disposed between the receiving holes at opposite ends of each of the receiving holes in a longitudinal direction of the section thereof in a direction in which the receiving holes are arranged.

In Japanese Patent Application Publication No. 2011-171178, a large number of screw holes are formed in the battery pack case in order to maintain mechanical coupling between battery modules using screws so as not to be moved by vibration in an upward-downward direction, a leftward-rightward direction, and a frontward-rearward direction. Since large numbers of screw holes and screws are used in order to fix the battery modules, however, a large number of subsidiary materials are necessary and the number of additional processes is increased accordingly, whereby time and cost are increased.

PRIOR ART DOCUMENTS (Patent Document 1) Korean Patent Application Publication No. 2017-0022119
(Patent Document 2) Japanese Patent Application Publication No. 2011-171178

DISCLOSURE

Technical Problem

The present invention has been made in view of the above problems, and it is an object of the present invention to provide a battery pack with improved vibration resistance that is capable of maintaining fixing force and mechanical coupling in a forward-rearward direction and in a leftward-rightward direction even when external vibration is applied to the battery pack.

It is another object of the present invention to provide a battery pack with improved vibration resistance wherein, when the battery pack is fixed to a device, fastening is easily performed while no separate space is necessary.

It is a further object of the present invention to provide a battery pack with improved vibration resistance that is capable of protecting battery cells from external impact.

Technical Solution

In order to accomplish the above objects, a battery pack according to the present invention includes a housing having a predetermined space portion, an end plate received in the space portion, the end plate including a horizontal plate located parallel to the bottom surface of the housing and a pair of vertical plates extending from opposite edges of the horizontal plate in a perpendicular direction, and a plurality of cell cartridges received in the end plate so as to be vertically disposed, a plurality of pairs of first recessed portions facing each other provided in the inner surface of the housing, and protrusions configured to be coupled to the first recessed portions provided on opposite ends of the cell cartridges in a thickness direction.

Also, in the battery pack according to the present invention, the front surface of a first cell cartridge among the plurality of cell cartridges, may be disposed in contact with the inner surface of a first vertical plate of the pair of vertical plates while a rear surface of a second cell cartridge among the plurality of cell cartridges may be disposed in contact with an inner surface of a second vertical plate of the pair of vertical plates, and the first vertical plate may be located spaced apart from a first side wall of the housing by a predetermined distance to form a first space portion.

Also, in the battery pack according to the present invention, the second vertical plate may be spaced apart from a second side wall of the housing by a predetermined distance to form a second space portion smaller than the first space portion, and a battery management system may be received in the first space portion.

Also, in the battery pack according to the present invention, the horizontal plate may be provided at the lower surface thereof with a bolt extending a predetermined length, and a first fastening hole configured to receive the bolt may be formed in the bottom surface of the housing.

Also, in the battery pack according to the present invention, a projecting portion may be further formed in the first fastening hole.

Also, in the battery pack according to the present invention, a nut may be seated on the projecting portion, and the nut and an end of the bolt may not protrude out of the housing.

Also, in the battery pack according to the present invention, the housing may be further provided in the bottom surface thereof with a second fastening hole having a female screw groove configured to receive a bolt extending from a device, the second fastening hole being located at a position spaced apart from the first fastening hole by a predetermined distance.

Also, in the battery pack according to the present invention, each of the vertical plates may be provided with an extension portion extending a predetermined length in a width direction, and a second recessed portion configured to receive the extension portion may be formed in the housing.

In addition, a device according to the present invention has the battery pack.

Advantageous Effects

In a battery pack with improved vibration resistance according to the present invention, protrusions of a cell cartridge are coupled to recessed portions of a housing, and therefore it is possible to securely fix the cell cartridge even when the battery pack is moved in a forward-rearward direction and in a leftward-rightward direction.

Also, in the battery pack with improved vibration resistance according to the present invention, a second fastening hole for fixing of the housing is provided, whereby it is possible to more easily fix the battery pack to a device. In addition, it is possible to reduce production cost and to improve space utilization as the result of reduction in number of parts.

Furthermore, in the battery pack with improved vibration resistance according to the present invention, an end plate and the housing are spaced apart from each other by a predetermined distance in order to form a space portion, whereby it is possible to protect the cell cartridge even when physical impact occurs.

DESCRIPTION OF DRAWINGS

FIG. 1 is a perspective view of a battery pack according to a first preferred embodiment of the present invention.

FIG. 2 is an exploded perspective view of the battery pack according to the first preferred embodiment of the present invention.

FIG. 3 is a plan view of the battery pack according to the first preferred embodiment of the present invention when viewed from above.

FIG. 4 is a perspective view of the battery pack according to the first preferred embodiment of the present invention when viewed from below.

FIG. 5 is a sectional view of the battery pack according to the first preferred embodiment of the present invention taken along line A-A' of FIG. 4.

FIG. 6 is a perspective view of a battery pack according to a second preferred embodiment of the present invention.

FIG. 7 is an exploded perspective view of the battery pack according to the second preferred embodiment of the present invention.

BEST MODE

In the present application, it should be understood that the terms "comprises," "has," "includes," etc. specify the presence of stated features, numbers, steps, operations, elements, components, or combinations thereof, but do not preclude the presence or addition of one or more other features, numbers, steps, operations, elements, components, or combinations thereof.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, a battery pack with improved vibration resistance according to the present invention will be described with reference to the accompanying drawings.

FIG. 1 is a perspective view of a battery pack according to a first preferred embodiment of the present invention, FIG. 2 is an exploded perspective view of the battery pack according to the first preferred embodiment of the present invention, and FIG. 3 is a plan view of the battery pack according to the first preferred embodiment of the present invention when viewed from above.

In describing the battery pack according to the present invention, an X-axis direction is defined as a longitudinal direction, a Y-axis direction is defined as a width direction, and a Z-axis direction is defined as a height direction for the sake of convenience.

In addition, for a cell cartridge, the X-axis direction is defined as thickness, the Y-axis direction is defined as width, the Z-axis direction is defined as height, and surfaces facing in the X-axis direction are defined as a front surface and a rear surface.

Referring to FIGS. 1 to 3, the battery pack according to the present invention includes a plurality of cell cartridges 100, an end plate 200, and a housing 300.

Protrusions 110 are formed on opposite ends of each of the plurality of cell cartridges 100, received in the end plate 200 so as to be vertically disposed, in the thickness direction thereof, and an electrode assembly (not shown) is provided in each of the cartridges.

Although not concretely shown in the figures, each of the cell cartridges 100 is formed so as to have a shape that wraps the contour of the electrode assembly. One or two electrode assemblies are fixed to one cell cartridge.

Here, the electrode assembly includes a cell assembly, a case, and leads. The cell assembly may be a jelly-roll type cell assembly, which is configured to have a structure in which a long sheet type positive electrode and a long sheet type negative electrode are wound in the state in which a separator is interposed between the positive electrode and the negative electrode, a stacked type cell assembly including unit cells, each of which is configured to have a structure in which a rectangular positive electrode and a rectangular negative electrode are stacked in the state in which a separator is interposed therebetween, a stacked and folded type cell assembly, which is configured to have a structure in which unit cells are wound using a long separation film, or a laminated and stacked type cell assembly, which is configured to have a structure in which unit cells are stacked in the state in which a separator is interposed therebetween and are then attached to each other. However, the present invention is not limited thereto.

The cell assembly is mounted in the case. The case is generally configured to have a laminate sheet structure including an inner layer, a metal layer, and an outer layer. The inner layer is disposed in direct contact with the cell assembly, and therefore the inner layer must exhibit high insulation properties and high resistance to an electrolytic solution. In addition, the inner layer must exhibit high sealability in order to hermetically seal the case from the outside, i.e. a thermally-bonded sealed portion between inner layers must exhibit excellent thermal bonding strength. The inner layer may be made of a material selected from among a polyolefin-based resin, such as polypropylene, polyethylene, polyethylene-acrylic acid, or polybutylene, a polyurethane resin, and a polyimide resin, which exhibit excellent chemical resistance and high sealability. However, the present invention is not limited thereto, and polypropylene, which exhibits excellent mechanical-physical properties, such as tensile strength, rigidity, surface hardness, and resistance to impact strength, and excellent chemical resistance, is the most preferably used.

The metal layer, which is disposed so as to abut the inner layer, corresponds to a barrier layer configured to prevent moisture or various kinds of gas from permeating into the battery from the outside. Aluminum foil, which is light and easily formable, may be used as a preferred material for the metal layer.

The outer layer is provided on the other surface of the metal layer. The outer layer may be made of a heat-resistant polymer that exhibits excellent tensile strength, resistance to moisture permeation, and resistance to air transmission such that the outer layer exhibits high heat resistance and chemical resistance while protecting the cell assembly. As an example, the outer layer may be made of nylon or polyethylene terephthalate. However, the present invention is not limited thereto.

Meanwhile, the leads, i.e. a positive electrode lead and a negative electrode lead, are exposed out of the case after a positive electrode tab and a negative electrode tab of the cell assembly protrude above the cell cartridge and are electrically connected respectively to the positive electrode lead and the negative electrode lead via a busbar. The battery cell described above corresponds to a generally known construction, and therefore a more detailed description thereof will be omitted.

The end plate 200 is received in a space portion formed in the housing 300, and includes a horizontal plate 210 located parallel to the bottom surface of the housing 300 and a pair of vertical plates 220 extending from opposite edges of the horizontal plate 210 in a perpendicular direction.

The end plate 200 is configured to fix the plurality of cell cartridges 100. Specifically, the plurality of cell cartridges 100 is seated on the upper surface of the horizontal plate 210 so as to be arranged side by side in the thickness direction. The front surface of a cell cartridge 100 located at one edge is disposed in tight contact with the inner surface of a vertical plate 220 located at one side, which is one of the pair of vertical plates 220, and the rear surface of a cell cartridge 100 located at the other edge is disposed in tight contact with the inner surface of the other vertical plate 220.

Meanwhile, it is preferable that, when the end plate 200 is received in the space portion formed in the housing 300, at least one of the pair of vertical plates 220 be located spaced apart from a side wall of the housing 300 by a predetermined distance.

As an example, as shown in FIG. 3, a first space portion 350 may be formed between the left vertical plate 220 and the side wall of the housing 300, and a second space portion 360 may be formed between the right vertical plate 220 and the side wall of the housing 300. Furthermore, the first space portion 350 may be larger than the second space portion 360.

Although not shown in the figures, a battery management system (BMS) (not shown) and various kinds of electronic parts configured to control and manage the battery pack may be received in the first space portion 350. Of course, the battery management system (BMS) is directly or indirectly connected to a busbar configured to connect the leads protruding from the cell cartridges 100 to each other in series or in parallel.

An algorithm for controlling the supply of power to a device, measuring electrical property values, such as current and voltage, controlling charge and discharge, controlling voltage equalization, and estimating state of charge (SOC) is applied to the battery management system (BMS) such that the battery management system serves to monitor and control the state of a secondary battery. The battery management system corresponds to known technology, and therefore a detailed description thereof will be omitted.

The second space portion 360, which is smaller than the first space portion 350, is configured to protect the cell cartridges 100 from external impact. That is, even when unintentional external impact is applied to the housing 300, it is possible to minimize the impact transferred to the cell cartridges 100 due to the space portion between the side wall of the housing 300 and the vertical plate 220. Of course, it is obvious that the first space portion 350, in which the battery management system (BMS) (not shown) and the like are received, is also capable of performing the same function.

Next, the housing 300 has a space portion of a predetermined size in order to receive the cell cartridges 100 and the end plate 200, and includes a bottom surface disposed horizontally and side surfaces extending along the edge of the bottom surface in a vertical direction. Of course, although not shown in the figures, it is obvious that a housing cap (not shown) configured to hermetically seal an upper opening of the housing 300 may be further provided.

A plurality of pairs of first recessed portions 310 facing each other is provided in the inner surface of the housing 300, which is configured to receive the end plate 200, in which the plurality of cell cartridges 100 is mounted, more specifically, in the longitudinal direction of the housing 300.

The protrusions 110 of the cell cartridges 100 are inserted into the first recessed portions 310 of the housing 300. Even in the case in which external impact is applied to the housing 300 in the longitudinal direction or a device having the housing 300 mounted therein moves, therefore, it is possible to inhibit deviation of the cell cartridges 100 from predetermined positions.

Although the figures show that the protrusions 110 are formed on all of the cell cartridges 100 and the first recessed portions 310 equal in number to the protrusions 110 are provided, the protrusions 110 may be formed in only a pair of outermost cell cartridges 100 and four first recessed portions 310 may be provided such that the protrusions 110 can be inserted thereinto. More preferably, however, all of the cell cartridges 100 are inserted into the first recessed portions 310 in order to provide more secure fixing force.

A bolt 211 extending a predetermined length may be provided on the lower surface of the horizontal plate 210, and a first fastening hole 320 configured to receive the bolt 211 and a second fastening hole 340, through which the housing 300 is fixed to the device, may be further provided in the bottom surface of the housing 300, which will be described below.

Meanwhile, reference numeral 380 is a cap, which is configured to prevent moisture from being introduced into the housing 300 through the first fastening hole 320. The cap may be made of plastic or metal, and may be fixed to the first fastening hole 320 by interference fitting. More preferably, however, the cap is fixed to the first fastening hole by welding in order to securely block moisture.

FIG. 4 is a perspective view of the battery pack according to the first preferred embodiment of the present invention when viewed from below, and FIG. 5 is a sectional view of the battery pack according to the first preferred embodiment of the present invention taken along line A-A' of FIG. 4.

Referring to FIGS. 4 and 5, a plurality of bolts 211 is provided at the lower surface of the horizontal plate 210, and first fastening holes 320, each of which has an inner diameter capable of allowing a corresponding one of the bolts 211 to extend therethrough, are formed in the bottom surface of the housing 300. Nuts 330 are fastened to ends of the bolts 211, whereby the end plate 200 is securely fixed to the housing 300.

Here, it is preferable that the length of each of the bolts 211 be equal to or less than the length of a corresponding one of the first fastening holes 320 so as not to protrude outwards from the housing 300. This configuration is necessary to prevent the nuts 330 fastened to the bolts 211 from protruding outwards from the bottom surface of the housing 300 to thus prevent the battery pack from escaping from the device when the battery pack is fastened to the device.

Meanwhile, each of the first fastening holes 320 is provided with a projecting portion 321 to seat a corresponding one of the nuts 330.

A second fastening hole 340 having a female screw groove configured to receive a bolt (not shown) extending from the device may be further provided in the bottom surface of the housing 300.

Specifically, a bolt extending from a device in which the battery pack is to be mounted is inserted into the second fastening hole 340 of the housing 300 in order to fix the battery pack to the device.

Conventionally, a separate fixing means is used to fix the battery pack. As a result, the number of parts is increased, and an additional space is necessary accordingly.

In the battery pack according to the present invention, however, the second fastening holes 340 are provided in the housing 300, whereby it is possible to more easily fix the battery pack to the device. In addition, it is possible to reduce production cost and to improve space utilization as the result of reduction in number of parts.

Here, it is preferable that the second fastening hole 340 have a depth to the extent to which the second fastening hole is not completely formed through the housing 300. This configuration is necessary to prevent moisture from being introduced into the housing 300 through the second fastening hole 340.

In the figure, four second fastening holes 340 are shown as being formed at positions spaced apart from the first fastening holes 320 by a predetermined distance, which, however is merely an example. The position and number of second fastening holes may be changed without limit in consideration of the weight and fastening and fixing force of the battery pack.

FIG. 6 is a perspective view of a battery pack according to a second preferred embodiment of the present invention, and FIG. 7 is an exploded perspective view of the battery pack according to the second preferred embodiment of the present invention.

The second embodiment of the present invention will be described with reference to FIGS. 6 and 7. The second embodiment is identical to the first embodiment except that extension portions 221 are provided at the vertical plates 220 in the width direction and second recessed portions 370 configured to receive the extension portions 221 are formed in the housing 300.

Specifically, in the second embodiment, the vertical plates 220 are provided with extension portions 221 extending a predetermined length in the width direction, and the housing 300 is further provided with second recessed portions 370 configured to receive the extension portions 221.

Consequently, the end plate 200 may be more securely fixed to the housing 300 by coupling between the extension portions 221 of the vertical plates 220 and the second recessed portions 370.

The battery pack according to the present invention may be mounted in a device. Concrete examples of the device may include a vehicle, a mobile phone, and a laptop computer. Such a device has various kinds of complicated functions and thus requires a large amount of electrical energy. For this reason, a high-capacity, high-voltage battery pack is mounted in the device in order to supply power to the device.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and the technical idea of the present invention, and it will be obvious that such changes and modifications fall within the scope of the appended claims.

DESCRIPTION OF REFERENCE NUMERALS

100: Cell cartridge
110: Protrusion
200: End plate
210: Horizontal plate 211: Bolt
220: Vertical plate 221: Extension portion
300: Housing
310: First recessed portion
320: First fastening hole 321: Projecting portion
330: Nut
340: Second fastening hole
350: First space portion
360: Second space portion
370: Second recessed portion
380: Cap

The invention claimed is:

1. A battery pack comprising:

a housing having a bottom wall, end walls spaced from each other by a first distance in a first direction and side walls to form a space portion;

an end plate received in the space portion, the end plate comprising a horizontal plate located parallel to the bottom wall of the housing and a pair of vertical plates spaced from each other by a second distance in the first direction and extending from opposite edges of the horizontal plate in a perpendicular direction;

a plurality of cell cartridges received in the end plate so as to be vertically disposed;

a plurality of pairs of first recessed portions facing each other provided in an inner surface of the side walls; and protrusions configured to be coupled to the plurality of pairs of first recessed portions provided on opposite ends of the cell cartridges in a thickness direction, wherein the first distance is greater than the second distance, wherein the plurality of cell cartridges are stacked in the first direction, wherein the first vertical plate is located spaced apart from a first end wall of the housing by a predetermined distance to form a first space portion, wherein the second vertical plate is located spaced apart from a second end wall of the housing by a predetermined distance to form a second space portion, wherein the horizontal plate is provided at a lower surface thereof with a bolt extending a predetermined length, wherein the bolt is positioned between the pair of vertical end plates of the end plate, wherein a first fastening hole configured to receive the bolt is formed in the bottom wall of the housing, wherein the bolt passes through the first fastening hole, and wherein a nut is fastened to an end of the bolt.

2. The battery pack according to claim 1, wherein a front surface of a first cell cartridge among the plurality of cell cartridges is disposed in contact with an inner surface of a first vertical plate of the pair of vertical plates while a rear surface of a second cell cartridge among the plurality of cell cartridges is disposed in contact with an inner surface of a second vertical plate of the pair of vertical plates.

3. The battery pack according to claim 2, wherein the second space portion is smaller than the first space portion, and wherein a battery management system is received in the first space portion.

4. The battery pack according to claim 1, wherein a projecting portion is further formed in the first fastening hole.

5. The battery pack according to claim 4, wherein a nut is seated on the projecting portion, and wherein the nut and an end of the bolt do not protrude out of the housing.

6. The battery pack according to claim 1, wherein a second fastening hole having a female screw groove configured to receive a bolt extending from a device is formed in the bottom wall of the housing, the second fastening hole being located at a position spaced apart from the first fastening hole by a predetermined distance.

7. The battery pack according to claim 2, wherein each of the vertical plates is provided with an extension portion extending a predetermined length in a width direction, and wherein a second recessed portion configured to receive the extension portion is formed in the housing.

8. A device having the battery pack according to claim 1.

9. The battery pack according to claim 1, further comprising a cap in the first fastening hole and covering the bolt.

10. The battery pack according to claim 5, further comprising a cap in the first fastening hole and covering the bolt and nut.

11. The battery pack according to claim 1, wherein a width of each of the vertical plates is greater than a width of the horizontal plates to form the extension portion.

12. The battery pack according to claim 1, wherein a width of the protrusions is less than a width of the ends of the cell cartridges.

13. The battery pack according to claim 1, wherein the horizontal plate of the end plate is connected to the bottom wall of the housing.

* * * * *